Patented Mar. 29, 1927.

1,622,372

UNITED STATES PATENT OFFICE.

WILHELM GLUUD, OF DORTMUND-EVING, GERMANY.

PROCESS FOR THE MANUFACTURE OF HYDROCYANIC ACID.

No Drawing. Application filed April 18, 1924, Serial No. 707,473, and in Germany April 23, 1923.

It is of extreme importance from an economical point of view to solve the problem of manufacturing products of value from hydrogen sulphocyanide or its salts, as it is possible to obtain large quantities of sulphocyanide salts in various industrial manufactures for instance in the coal gas industry, in coking plants, etc.

Hitherto however the sulphocyanides were not produced on a large scale as no proper use for anything more than small quantities could be found.

The importance of finding a use for the sulphocyanides was realized in the year 1877, when the Verein zur Beförderung des Gewerbefleisses in Preussen (Society for the Improvement of Commercial Industry in Prussia) offered a prize for the solution of the problem.

In consequence thereof the sulphocyanides have been closely investigated. An absolutely satisfactory result however was not achieved. In England particularly the investigation was carried out with special care. Playfair describes a plant (British Patent 7764/1890), in which sulphocyanide is fused with zinc, whereby zinc sulphide and potassium cyanide are generated according to the equation:

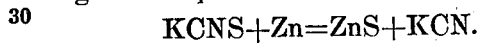

$$KCNS + Zn = ZnS + KCN.$$

The process could not be introduced with economical success because of the large quantities of zinc required and on account of the cost entailed by the recovery of the metal from the sulphide. Conroy tried to replace the metallic zinc by hydrogen (J. S. C. Ind. XVII 320 [1901]). His results did apparently not suffice to justify a trial on a large scale.

The investigations of utilizing the sulphocyanides have resulted at last in developing a process, which was introduced into practical working under the name of Raschen-Process in England U. S. P. 567551 (1896). According to this process hydrogen sulphocyanide is oxidized with nitric acid, whereby the sulphur is transformed into sulphuric acid at the expense of the nitric acid. As a final product aimed at hydrogen cyanide is produced with good yield, which after being freed from nitrous gases, generated as by-product, in large scrubbing plants, is passed into alkali lyes. These are evaporated to obtain alkali cyanides. The nitrous gases are caught separately and nitric acid is regenerated therefrom in the usual way. The working plant is, therefore, a combination of two plants, i. e. a plant for nitric acid and one for hydrogen cyanide. By the use of the expensive nitric acid the hydrogen cyanide obtained becomes comparatively costly. Any loss of the acid has to be avoided most carefully because it would turn the process from a moderate economical success into complete failure.

Now I have discovered that the transformation of the hydrogen sulphocyanide or its salts or compounds into hydrocyanic acid can be achieved by subjecting the said substances or compounds at an elevated temperature to the action of gaseous oxygen whereby, though, the oxygen need not be present in the pure state but can also be used in mixture with other gases. The process can for instance be carried out with great advantage by employing air as oxidizing agent. By using air for instance, being the cheapest oxidizer available, not only the material cost of the manufacture is greatly reduced, but also the expense of recovering and regenerating the nitric acid with the cumbersome scrubbing plant necessitated thereby is avoided altogether.

According to my invention I mix sulphocyanic acid or its volatile compounds such as esters or such like with oxygen or with gases containing oxygen in suitable proportions and heat the mixture to an elevated temperature, whereby the transformation takes place, according to the following equation

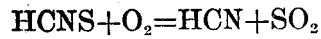

$$HCNS + O_2 = HCN + SO_2$$

The analogous reaction occurs if instead of the free acid its salts or compounds or organic derivatives, for instance the esters are subjected to the action of oxygen. An example includes the following reaction:

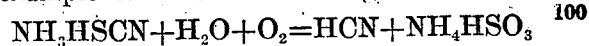

$$NH_3HSCN + H_2O + O_2 = HCN + NH_4HSO_3$$

In subsequently describing the ways and methods for carrying out the process of producing hydrocyanic acid or its salts from hydrogen sulphocyanide or its salts which may be volatilized or its volatile compounds, I shall name air, being a mixture of oxygen and nitrogen, as oxidizing agent, but I wish it to be understood that in its place oxygen alone or any other gas or gas mixtures containing oxygen may be taken.

Further, I have found that when using salts of the sulphocyanic acid for instance ammonium sulphocyanide, being not quite readily volatilized without decomposition, it is sufficient to make the oxygen or the gases containing oxygen react upon the salt in a very fine form of distribution. This state of fine subdivision is obtained for instance by spraying or atomizing the solution by means of a jet of steam either of ordinary pressure or in a superheated condition. Or the solution may be atomized by air under pressure, whereby the subsequent addition of air becomes either totally or partly, superfluous. Another way of effecting the fine subdivision is by distilling the solutions by means of steam. This may be carried out by allowing the salt solution to flow slowly into a suitable container heated to a temperature which will allow an instantaneous vaporization of the solution. Such a temperature is for instance 350° C. By the sudden formation of superheated steam from the aqueous solution an almost complete distillation of the sulphocyanide is assured. A current of air which may be preheated may be introduced at the bottom of the container to facilitate the convection of the salts or compounds. The introduction of the air however shall not be restricted to this method, but it may be introduced into and mixed with the superheated steam carrying the sulphocyanide in any other suitable way. Further the distillation of the salt by means of steam may be carried out in the usual well known way by passing highly superheated steam through the heated solution, or finally, the superheated steam may be introduced into the solid sulphocyanide after melting it.

The introduction of air, a few instances of which have been described above, may be achieved in any other way convenient. For instance the mixture of steam and hydrogen sulphocyanide or its salts or compounds may be allowed to enter a chamber or such like, where, by decreasing the pressure below the atmospheric, air is drawn in, the amount required being regulated by suitable devices. Or the air may be blown into the mixture of steam and sulphocyanide thereby incidentally increasing the pressure above the atmospheric.

The quantity of air necessary for the complete transformation of the sulphocyanide varies according to the amount of steam its relative contents of hydrogen sulphocyanide or its salts or compounds the rate of flow and the temperature used. I found it useful to apply an excess of about five times the stoichiometric quantity, but I do not want to limit myself to the quantity indicated.

The reaction temperatures depend largely on the materials used for the apparatus in which the reaction takes place and may vary to a large extent. Rough surfaces as well as the presence of metals such as for instance iron or aluminum accelerate the action and by their catalyzing influence tend to decrease the temperature most favorable for the transformation. Temperatures favorable for the reaction are for instance 350–750° C., although the reaction proceeds even below and beyond this range.

The heat may be applied in various ways. For instance the mixture containing air and hydrogen sulphocyanide alone or in combination with other gases or vapors, or the mixture containing air and salts which may be volatilized or compounds of sulphocyanide acid in combination with other gases or vapors may be passed through a tube or a series of tubes consisting of a suitable material for instance of refractory clay or silica or of metal such as aluminum or iron or such like or of an iron tube calorized with aluminum which are heated externally to the required temperature.

Another alternative is to add to the mixture of sulphocyanic acid or its salts or compounds and vapors for instance steam, a current of air which is previously heated high enough to cause the reaction to take place in the mixture; or air is heated in a suitable container and the sulphocyanic acid alone or in mixture with gases or vapors or the volatilized salts or compounds in mixture with gases or vapors are allowed to enter the container and to mix in a suitable way with the heated air.

The pressure existing in the reacting mixture will depend chiefly upon the method adopted for working, but it does not substantially influence the action whether the reaction proceeds at atmospheric pressure or at reduced or increased pressure.

By the term "materials or compounds comprising HSCN" as used in the claims is included not only HSCN itself but also the addition compounds of HSCN with bases such as ammonia the methylamines, etc. By the term "substantially vaporized" is included not only strict vapors but also, for example, atomized materials like $NH_4SCN$ which may be blown into the treatment chamber with air or steam.

What I claim is:

1. The process of manufacturing hydrocyanic acid, which comprises treating finely divided material comprising HSCN with oxygen at a temperature high enough to oxidize combined sulphur.

2. Process of manufacturing hydrocyanic acid, which comprises treating substantially vaporized material comprising HSCN with oxygen at a temperature high enough to oxidize combined sulphur.

3. Process of manufacturing hydrocyanic acid, which comprises treating substantially vaporized material comprising HSCN with oxygen at a temperature of from about 350° C. to 750° C.

4. Process of manufacturing hydrocyanic acid which comprises treating substantially volatile sulphocyanides by mixing the same intimately with an amount of air in excess of that required to form $SO_2$ from the sulphur present and heating to a temperature of from about 350° C. to 750° C.

5. Process of manufacturing hydrocyanic acid which comprises treating substantially vaporized ammonium sulphocyanide by mixing the same intimately with an amount of air in excess of that required to form $SO_2$ from the sulphur present and heating to a temperature of from about 350° C. to 750° C.

6. Process of manufacturing hydrocyanic acid which comprises treating substantially vaporized materials comprising HSCN with oxygen in the presence of a catalyst at a temperature of from about 350° C. to 750° C.

7. Process of manufacturing hydrocyanic acid which comprises treating atomized ammonium sulphocyanide with oxygen in the presence of iron calorized with aluminum and at a temperature of from about 350° C. to 750° C.

8. Process of manufacturing hydrocyanic acid which comprises treating substantially vaporized materials comprising HSCN with oxygen in a container having a catalytic surface at a temperature of from about 350° to 750° C.

9. Process of manufacturing hydrocyanic acid which comprises treating substantially vaporized materials comprising HSCN with an excess of about five times the stoichiometric quantity of air to oxidize combined sulphur at a temperature of from about 350° C. to 750° C.

10. Process of manufacturing hydrocyanic acid which comprises treating ammonium sulphocyanide atomized with steam in a container having walls of iron calorized with aluminum, in the presence of about five times the stoichiometric quantity of air to oxidize the combined sulphur at a temperature of from about 350° C. to 750° C.

In testimony whereof I have signed my name to this specification.

WILHELM GLUUD.